United States Patent [19]

Klumpp

[11] Patent Number: 5,577,040
[45] Date of Patent: Nov. 19, 1996

[54] TELECOMMUNICATIONS TERMINAL PARTICULARLY FOR ELECTRONIC MASS MAIL AND MESSAGE DISTRIBUTION NETWORK

[75] Inventor: Dieter Klumpp, Schwabstrasse, Germany

[73] Assignee: Alcatel N.V., Rijswijk, Netherlands

[21] Appl. No.: 406,117

[22] Filed: Mar. 17, 1995

[30] Foreign Application Priority Data

Mar. 18, 1994 [DE] Germany ............... 44 09 458.2

[51] Int. Cl.$^6$ ............. H04L 12/16; H04N 7/025
[52] U.S. Cl. ............. 370/73; 370/110.1; 379/96; 455/5.1; 455/6.3; 348/12
[58] Field of Search ............. 370/71, 73, 124, 370/110.1; 379/93, 96; 348/6, 7, 12, 13; 455/2, 3.1, 4.1, 4.2, 5.1, 6.3

[56] References Cited

U.S. PATENT DOCUMENTS

| | | |
|---|---|---|
| 4,686,667 | 8/1987 | Ohnsorge . |
| 4,837,798 | 6/1989 | Cohen et al. . |
| 4,984,155 | 1/1991 | Geier et al. . |
| 5,357,504 | 10/1994 | Siegmund . |
| 5,396,546 | 3/1995 | Remillard ............... 379/96 |
| 5,404,393 | 4/1995 | Remillard ............... 379/96 |
| 5,414,773 | 5/1995 | Handelman ............... 379/96 |
| 5,416,831 | 5/1995 | Chewning, III et al. ............... 379/96 |

FOREIGN PATENT DOCUMENTS

| | | |
|---|---|---|
| 0344672 | 12/1989 | European Pat. Off. . |
| 0445532 | 9/1991 | European Pat. Off. . |
| 3138473 | 5/1983 | Germany . |
| 3590072 | 8/1985 | Germany . |
| 3403659 | 8/1985 | Germany . |
| 3432935 | 3/1986 | Germany . |
| 3207022 | 9/1986 | Germany . |
| 3507479 | 9/1986 | Germany . |
| 3418618 | 11/1987 | Germany . |
| 3921943 | 1/1991 | Germany . |
| 4010574 | 1/1991 | Germany . |
| 4106183 | 9/1992 | Germany . |
| 4008727 | 12/1992 | Germany . |
| 3135005 | 3/1993 | Germany . |
| 4228801 | 4/1993 | Germany . |
| 4201696 | 7/1993 | Germany . |
| 1735860 | 5/1992 | U.S.S.R. . |
| 9009074 | 8/1990 | WIPO . |
| 9307713 | 4/1993 | WIPO . |

OTHER PUBLICATIONS

"ISDN im Büro—HICOM", *Sonderausgabe telcom report und Siemens Magazin COM*, 1985, Siemens AG, Berlin, Munich, ISBN 3-8009-3846-4, pp. 26–31.

"B–ISDN Multimedia Workstation Architecture", S. Sakata, *IEEE Communications Magazine*, Aug. 1993, pp. 64–67.

"Wege zu Breitband–Multimedia–Anwendungen (1)", H. Armbrüster et al, *Ntz*, vol. 46 (1993), No. 5, pp. 358–363.

"Moderne Strategien für die DV–und TK–Integration in Unter–nehmensnetzen", A. Badach, *Ntz*, vol. 46 (1993), No. 7, pp. 518–525.

"Tausend Videotextseiten im Speicher", H. Fink, *Funkschau*, vol. 23, 1992, pp. 110–115.

"Downloading All Teletext Pages to a Computer", M. Gündüzalp, *IEEE Transactions on Consumer Electronics*, vol. 39, No. 4, Nov. 1993, pp. 832–836.

(List continued on next page.)

Primary Examiner—Wellington Chin
Attorney, Agent, or Firm—Ware, Fressola, Van Der Sluys & Adolphson

[57] ABSTRACT

A telecommunications terminal for receiving electronic mass mail is presented. The terminal according to the invention comprises a control unit (PC), a display unit (D) for indicating whether at least one new message has been received, and with input means (T) for activating an overview of a display of captions, which characterize the messages and are contained in the received messages, and to select and show the messages assigned to the captions on the display unit, and/or to delete the captions and/or delete the messages assigned to the captions.

17 Claims, 2 Drawing Sheets

OTHER PUBLICATIONS

"ISDN–TK–System integriert Telefax–, Teletex–und PC Kommunikation", D. Hochreuter, *Ntz*, vol. 45 (1992), No. 5, pp. 340–347.

"E–Mail in der Unternehmenskommunikation", V. Sklos, *Ntz*, vol. 43, 1990, No. 6, pp. 481–482.

"Möglichkeiten der Multimediakommunikation", T. Kummerow, *Telenorma Nachrichten*, 1993, No. 97/N, pp. 3–10.

"Multimedia–Terminals: Nutzen, Technik, Netzanbindung", J. Dampz et al, *Elektrisches Nachrichtenwesen*, 4th Quarter 1993, pp. 387–393.

| 1/25/1994 | Advertisement  Company : Alcatel | |
|---|---|---|
| 1/28/1994 | Advertisement  Company : Pizza Express | |
| 2/13/1994 | Bookclub : "The Book"  for you | * |

| Execute | Delete | Menu | EXIT |

TELECOMMUNICATIONS TERMINAL PARTICULARLY FOR ELECTRONIC MASS MAIL AND MESSAGE DISTRIBUTION NETWORK

TECHNICAL FIELD

This invention relates to telecommunications and, more particularly, to electronic mail.

BACKGROUND OF THE INVENTION

Until now, supermarkets advertised specials by distributing handout leaflets in the large areas surrounding the supermarket; due to the appearance of large shopping centers, considerable amounts of large newspaper advertisements or inserts have been made in the daily newspapers. Among other things, a "bargain" can lead to considerable traffic, which is a disadvantage with respect to the total economy. Instances have been reported in practice, where housewives undertake a 20 km trip to save a few dollars with a special sale, which is also available in the nearest supermarket. The customer is given insufficient clarity, but would very much respond to better clarity.

The managements of modern communities increasingly tend toward optimized refuse removal chains. It has been noted in practice for example, that the deadlines for bulky refuse removal are announced beyond the actual collection area. The announcements, which normally appear in the daily newspapers, create considerable traffic, which goes well beyond the "semi-professional" searchers of bulky refuse. Refuse removers estimate that about 30% of bulky refuse deposits are derived from outside residential areas. In Stuttgart, Germany, for example, removers of bulky refuse from surrounding communities were seen repeatedly, while the reverse should also be true. Since the service is free, there does not seem to be any individual advantage, such as is the case with normal refuse tonnage, but purely a lack of clarity regarding the respective deadlines.

A number of pamphlet and handout leaflet suppliers increasingly encounter problems with mail boxes, which are marked with the now mandatory sticker "Please do not deposit any advertisements". In the United States, it is illegal for anyone other than the U.S. Postal Service employee to deposit mail in a mailbox labeled "U.S. Mail". For this reason it has been observed that more than 90% of the refuse in home entrances consist of accumulated handout leaflets, which are distributed by leafleteers. The normal case seems to be that the addressee briefly scans the leaflet and then puts it aside, without thinking about its removal. The leaflets are therefore surely read, otherwise the sellers would not continue to use them. Otherwise, with poor mail deliveries or prohibitive transportation costs and times, the use of local newspaper advertisements is mandatory for merchandise sellers and users.

DISCLOSURE OF THE INVENTION

The invention has the task of presenting a telecommunications terminal, particularly for receiving mass mail, and a corresponding message distribution network.

According to the invention, a telecommunications terminal for receiving messages is particularly adapted to receive electronic mass mail and comprises a control unit, a display unit to indicate whether at least one new message is present, and input means for activating a display of captions, which characterize the messages and are contained in the received messages for display on the display unit, the control unit in conjunction with the input means for selecting and presenting on the display unit the messages assigned to the captions and/or for erasing the captions and/or for erasing the messages assigned to the captions.

According further to the invention, a message distribution network with a service central is particularly adapted for electronic mass mail, wherein an integrated services digital network for distributing messages in packet format can be used to distribute messages through a signaling channel or a user channel through such a broad-band distribution network for audio and video programs to a number of telecommunications terminals, as described above.

Further advantageous configurations of the subject of the invention can be found in the subclaims.

The telecommunications terminal of the invention could advantageously be a "door-message-terminal", in the form of a 40×30×5 cm wall box (slightly larger than the DIN-A-4 size), which is located inside the residence in the immediate vicinity of the entrance. Building terminals can also be envisioned in individual cases. The terminal is located in the immediate functional vicinity of the apartment or building door, perhaps in the vicinity of the building's intercom installation.

The installation of such a door-message-terminal avoids the network effect problem that is usually present in telecommunication, insofar as with the installation of a corresponding regional unit, only regional sellers can reach the addressees through a regional service facility. The critical size must be taken into account for a region, because on the transmission side and with respect to the number of units, a not inconsiderable cost must be projected for the technical development. But the actual availability could already lead to functioning (and refinancing) information chains in the local area of large cities (100,000 subscribers).

This "door-message-service" represents no cost to the user —aside from the self-induced energy and paper costs —particularly with respect to the fees, and would first produce pre-investments on the part of the network operator and service provider, as well as from the sellers of information. On the other hand, the sellers must pay the fees for the new information transmission, which until now they paid for mail services or couriers.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
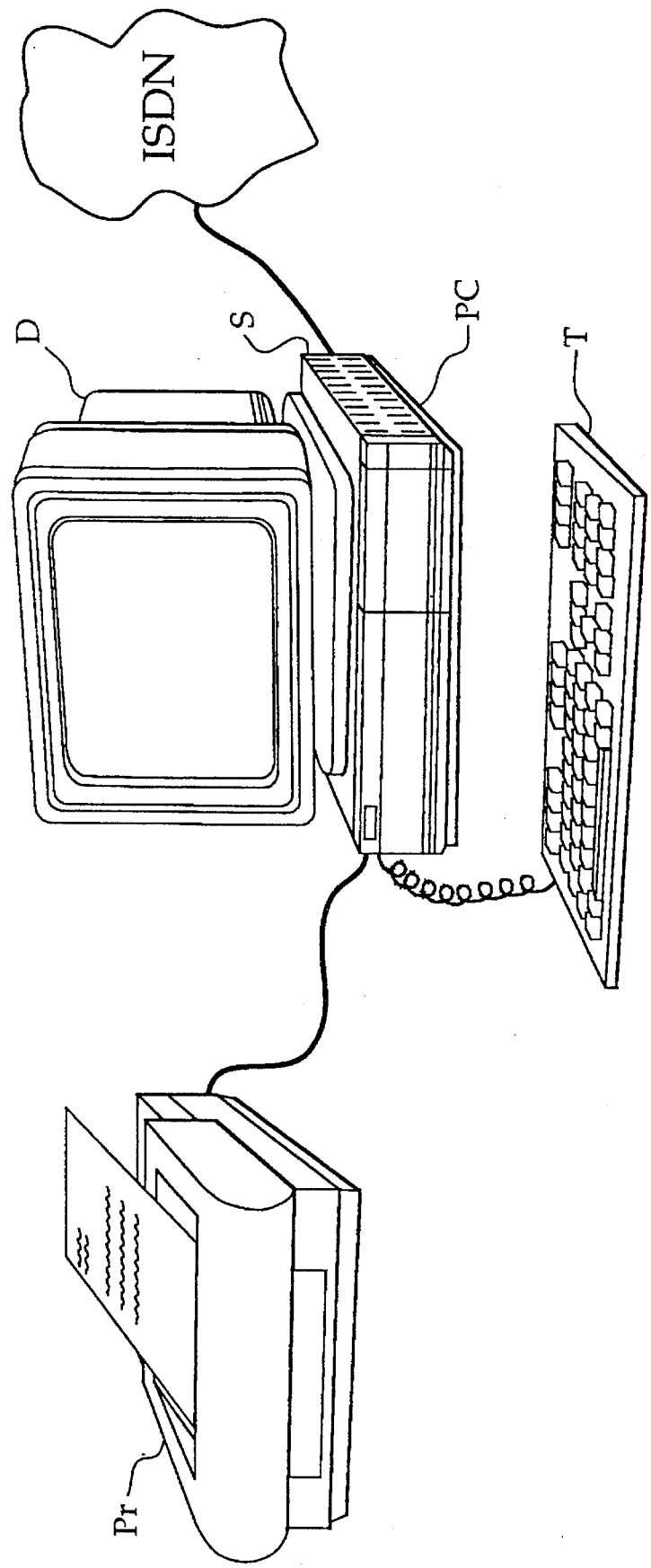
FIG. 1 is a telecommunications terminal according to the invention.

FIG. 1 shows a telecommunications terminal according to the invention that comprises a control unit PC, a display unit D and input means T. According to the invention, first the arrival of a new message is indicated, which can be done in the simplest case e.g. with a light-emitting (blinking) diode. The user can then ask for a display of the captions contained in the received messages, through the input means, e.g. in the form of a keyboard or a simple cursor control with a mouse. After that the user can have the messages assigned to the individual captions displayed, or he can delete the captions and/or the corresponding messages, so that unwanted mass publications do not infringe on anyone's private sphere. The user can then have a message that is of interest to him printed on a connectable or integrated printer Pr. At this point, it is important that he is not forced to make a printout, thus the question of paper refuse remains in the home.

The telecommunications terminal can be an $S_o$-interface (S) for an integrated services digital network (ISDN), so that messages in packet format can be received through a signaling channel which is advantageously controlled by the control unit PC. How such a D-channel packet transmission takes place can be seen e.g. in the German patent application DE 41 06 183 A1 having the counterpart U.S. Pat. No. 5,357,504. However, the messages can also be transmitted via a user channel (B-channel) of the ISDN.

According to another configuration of the invention, the telecommunications terminal can also contain an interface for connection to a message distribution network, such as a broad-band distribution network for audio and video programs. Such a broad-band distribution network can e.g. be found in the German patent application DE 34 03 659.8 A1 having the counterpart U.S. Pat. No. 4,686,667.

It is of special advantage if the telecommunications terminal according to the invention is a data processing terminal such as a personal computer with telephone functions for an ISDN network, or a television receiver with a corresponding remote control for an audio and video television program distribution network. In that case, the display unit D would correspond to the screen of the personal computer or the television receiver.

Figures 2A, 2B:
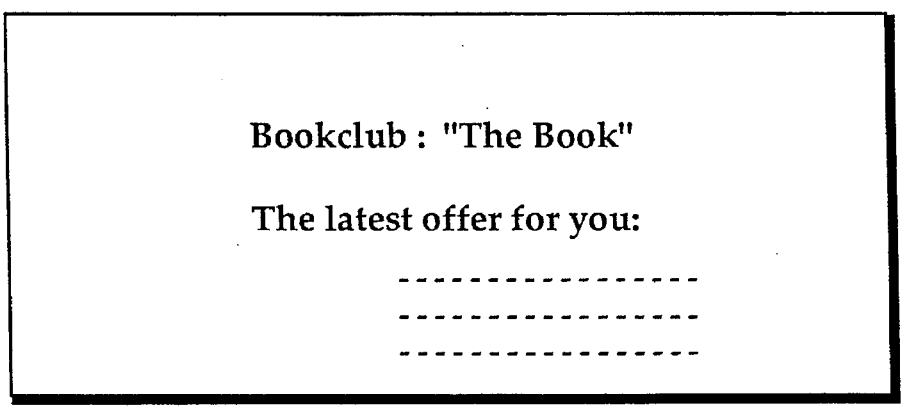
FIG. 2a illustrates an overview of captions over received messages.
FIG. 2b represents a message assigned to a caption.

If a message is received and shown on the display unit D in the form of captions, as shown, for example, in FIG. 2a, a mouse can then place the cursor over the caption "Book Club . . . . " and the assigned message in FIG. 2b can be displayed.

As illustrated in FIG. 2a, any desired user menu can be controlled. The delete function is particularly necessary to delete unwanted messages, or to delete only the captions at first, but later be able to access the actual messages.

In addition, it is possible to send out a message, e.g. through the telephone function of the personal computer, to request further messages from a service central which transmits messages, or to order merchandise.

It would then be possible to make a very cost-effective transmission of a DIN-A4 sheet, or any other selected size sheet, to a service provider, for example for a remote purchase. The service provider could also transmit the order of merchandise to the desired supermarket or the desired retailer; fees would be paid for this service.

According to the invention, a so-called service change, i.e. a switch to a facsimile service, is also possible. In that case an unchangeable sender code from the respective residence would provide the necessary security.

To realize such electronic mass mail, the invention proposes a message distribution network with a service central, which could provide for the distribution of messages in packet format through a signaling channel or a user channel of an integrated services digital network ISDN. Particularly the low expectancy on the part of the user of signal information in the D-channel would make a very cost-effective transmission of the messages possible without additional measures. Furthermore, the message distribution network could use the audio and video program cable network already available in many homes, where in the ideal case the telecommunications terminal would be a television set with remote control as the input means.

This would achieve that every household can be reached by a newly installed service provider with the help of existing infrastructure. This would reduce the transportation of mass publications and the physical transportation would respectively become so expensive, that it would pay the service provider to reach the residences via electronic means.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. Telecommunications terminal for receiving messages, particularly electronic mass mail, with comprising:

a control unit (PC);

a display unit (D) connected to said control unit to indicate whether at least one new received message is present;

input means (T) connected to said control unit for activating a display of captions on said display unit, each caption displayed on said display unit characterizing a respective received message and being contained in the respective received message, for selecting and presenting on the display unit respective received messages characterized by the captions, and/or for erasing the captions, and/or for erasing the respective received messages characterized by the captions; and means for sending a user message to a service central which receives data and transmits messages, and wherein in response to said user message, the service central transmits further messages or places an order for merchandise.

2. Telecommunications terminal as claimed in claim 1, further including a printer (Pr) connected to said control unit, for printing out respective received messages selected with the input means (T).

3. Telecommunications terminal as claimed in claim 2, further including an interface (S) for connecting said control unit to an integrated services digital network (ISDN).

4. Telecommunications terminal as claimed in claim 2, further including an interface for connecting said control unit to a message distribution network, particularly a broad-band distribution network for audio and video programs.

5. Telecommunications terminal as claimed in claim 2, which is a data processing terminal with telephone functions or a video receiver.

6. Telecommunications terminal as claimed in claim 1, further including an interface (S) for connecting said control unit to an integrated services digital network (ISDN).

7. Telecommunications terminal as claimed in claim 6, wherein the interface (S), controlled by the control unit (PC), can either receive messages in packet format through a signal channel or a user channel.

8. Telecommunications terminal as claimed in claim 7, wherein said control unit further includes means for switching to a facsimile service of the integrated services digital network, for sending a facsimile message to a service central which transmits the received messages.

9. Telecommunications terminal as claimed in claim 6, further including means for indicating that a new message has been received from the integrated services digital network.

10. Telecommunications terminal as claimed in claim 9, wherein said means for indicating includes a light-emitting diode that blinks when a new message has been received from the integrated services digital network.

11. Telecommunications terminal as claimed in claim 1, further including an interface for connecting said control unit to a message distribution network, particularly a broadband distribution network for audio and video programs.

12. Telecommunications terminal as claimed in claim 11, further including means for indicating that a new message has been received from the message distribution network.

13. Telecommunications terminal as claimed in claim 12, wherein said means for indicating includes a light-emitting diode that blinks when a new message has been received from the message distribution network.

14. Telecommunications terminal as claimed in claim 1, which is a data processing terminal with telephone functions or a video receiver.

15. Telecommunications terminal as claimed in claim 1, further including means for indicating that a new message has been received.

16. Telecommunications terminal as claimed in claim 15, wherein said means for indicating includes a light-emitting diode that blinks when a new message has been received.

17. Message distribution network comprising:

a service central, particularly for electronic mass mail;

an integrated services digital network connected to said service central for distributing messages in packet format through a signaling channel or a user channel, or for distributing messages through a broad-band distribution network for audio and video programs; and a number of telecommunications terminals connected to said integrated services digital network for receiving messages, particularly said electronic mass mail, each telecommunications terminal having:

a control unit;

a display unit connected to said control unit to indicate whether at least one new received message is present;

input means connected to said control unit for activating a display of captions on said display unit, each caption displayed on said display unit characterizing a respective received message and being contained in the respective received message, for selecting and presenting on the display unit respective received messages characterized by the captions, and/or for erasing the captions, and/or for erasing the respective received messages characterized by the captions; and means for sending a user message to a service central which receives data and transmits messages, and wherein in response to said user message, the service central transmits further messages or places an order for merchandise.

* * * * *

UNITED STATES PATENT AND TRADEMARK OFFICE
CERTIFICATE OF CORRECTION

PATENT NO. : 5,577,040
DATED : November 19, 1996
INVENTOR(S) : Dieter Klumpp

It is certified that error appears in the above-indentified patent and that said Letters Patent is hereby corrected as shown below:

Cover page, item: "[73] Inventor: Dieter Klumpp, Schwabstrasse," should read --[73] Inventor: Dieter Klumpp, Stuttgart,--

Signed and Sealed this

Twenty-fifth Day of February, 1997

Attest:

BRUCE LEHMAN

*Attesting Officer*  *Commissioner of Patents and Trademarks*